US00RE37289E

(19) United States
(12) Reissued Patent
Amano et al.

(10) Patent Number: US RE37,289 E
(45) Date of Reissued Patent: Jul. 24, 2001

(54) INDUCTION SYSTEM FOR ENGINE

(75) Inventors: Junkichi Amano; Tetsuji Yamazaki; Takashi Hara, all of Iwata (JP)

(73) Assignee: Yamaha Hatsudoki Kabushiki Kaisha, Iwata (JP)

(21) Appl. No.: 09/146,461

(22) Filed: Sep. 2, 1998

Related U.S. Patent Documents

Reissue of:
(64) Patent No.: 5,551,393
Issued: Sep. 3, 1996
Appl. No.: 08/342,811
Filed: Nov. 21, 1994

(30) Foreign Application Priority Data

Nov. 26, 1993 (JP) ..... 5-321085

(51) Int. Cl.[7] ..... F02B 31/00
(52) U.S. Cl. ..... 123/306; 123/193.5; 123/432
(58) Field of Search ..... 123/306, 308, 123/432, 193.5, 188.14

(56) References Cited

U.S. PATENT DOCUMENTS 4,686,948 * 8/1987 Smith, Jr. et al. ..... 123/188.14
4,763,622 * 8/1988 Indra et al. ..... 123/308
4,957,081 * 9/1990 Ito et al. ..... 123/308
5,138,989 * 8/1992 Fraidl et al. ..... 123/308
5,245,964 * 9/1993 Matsuo et al. ..... 123/308
5,394,845 * 3/1995 Noh et al. ..... 123/432
5,417,190 * 5/1995 Ando et al. ..... 123/308

* cited by examiner

*Primary Examiner*—Henry C. Yuen
*Assistant Examiner*—Arnold Castro
(74) *Attorney, Agent, or Firm*—Knobbe, Martens, Olson & Bear LLP

(57) ABSTRACT

An induction system for an internal combustion engine having at least one intake passage that is configured to generate a tumble and swirl to the intake charge. This is accomplished by providing a masked section adjacent the valve seat so that the flow entering the combustion chamber is directed across the combustion chamber to generate the tumble action. There is also provided a secondary intake passage that delivers a charge to the combustion chamber in a substantially unrestricted fashion so as to permit high power outputs. The secondary intake passage has the flow through it controlled by a throttle valve that is closed under low and mid-range running conditions.

24 Claims, 7 Drawing Sheets

INDUCTION SYSTEM FOR ENGINE

Matter enclosed in heavy brackets [ ] appears in the original patent but forms no part of this reissue specification; matter printed in italics indicates the additions made by reissue.

BACKGROUND OF THE INVENTION

This invention relates to an induction system for an engine, and more particularly to an improved induction system for generating turbulence in the combustion chamber of the engine under at least some running conditions.

As is well known, the induction system of an engine is extremely important in determining the performance of the engine. Induction systems that provide good low-speed torque and running frequently do not produce high power outputs at wide open throttle. The reason for this is that the induction system is designed so as to generate turbulence in the combustion chamber. However, the systems in the intake passage which generate turbulence generally provide a flow restriction, and hence maximum power output cannot be achieved.

It has been proposed, therefore, to provide an induction system for an engine that employs two intake passages, one to improve the low-speed performance by introducing turbulence and the other which directs the charge into the combustion chamber in a generally axial direction with low flow restriction to achieve maximum power output. These systems are very effective in improving the engine performance throughout the entire engine load and speed ranges.

Various forms of turbulence can be induced in the intake charge. Most conventionally, a swirl is imparted to the intake air that causes the air to flow in a circular path around the cylinder bore axis. This type of turbulence is relatively easy to generate, but does not always provide optimum performance. One reason for this is that the swirl tends to dissipate during the compressive stroke of the piston and may be at its lowest when the piston is at top dead center and when combustion occurs. This is, however, the time when maximum turbulence is desired.

Another form of turbulence, which has greater effect with many types of engines is called "tumble." Tumble is also a swirling motion, but it is generated about a transverse axis. The advantage of tumble is that the rate of swirl or tumble increases as the piston approaches top dead center, and hence is at its maximum at the time of ignition. Tumble is, however, more difficult to achieve.

It is, therefore, a principal object of this invention to provide an improved induction system for an engine that employs a tumble motion under at least some running conditions.

It is a further object of this invention to provide an improved intake passage configuration wherein tumble can be easily generated and with a minimum of flow restriction.

It has also been found that certain engines benefit if the motion generated in the combustion chamber under at least the low and mid-range speed conditions is a combination of swirl and tumble. It is, therefore, a still further object of this invention to provide an improved intake passage configuration wherein swirl and tumble can be generated.

Normally, engines having plural intake ports have the intake ports all disposed on one side of a plane containing the cylinder bore axis. In order to generate a tumble motion, it is generally necessary to direct the charge so that it flows from the intake ports across the cylinder bore toward the opposite side of the plane on which the intake ports lie. With conventional valve and port construction, it is difficult to achieve this result.

It is, therefore, a still further object of this invention to provide an improved arrangement for forming a valve seat and masking the intake valve so as to achieve a tumble motion in the combustion chamber.

SUMMARY OF THE INVENTION

This invention is adapted to be employed in an intake passage for the cylinder head of an internal combustion engine. The cylinder head has a combustion chamber surface that is adapted to be in facing relationship to a cylinder bore of an associated cylinder block to form a combustion chamber. The intake passage is formed in the cylinder head and extends from an inlet opening formed in an outer wall of the cylinder head to an intake valve seat formed in the cylinder head combustion chamber surface. The intake valve seat is juxtaposed to a peripheral edge of the cylinder bore and lies on one side of a plane containing the cylinder bore axis. The intake passage has a straight portion disposed, in the area between the inlet opening and the intake valve seat, at an acute angle to a plane defined by the portion of the cylinder head surrounding the combustion chamber surface. The straight portion curves into the intake valve seat. The intake valve seat is recessed at least in part in the combustion chamber surface on the side adjacent the cylinder bore for forming a masked area to direct the flow of the intake charge in the combustion chamber toward the cylinder bore on the opposite side of the plane to generate a tumble action in the flow into the combustion chamber.

DETAILED DESCRIPTION OF THE PREFERRED EMBODIMENT OF THE INVENTION

Figure 1:
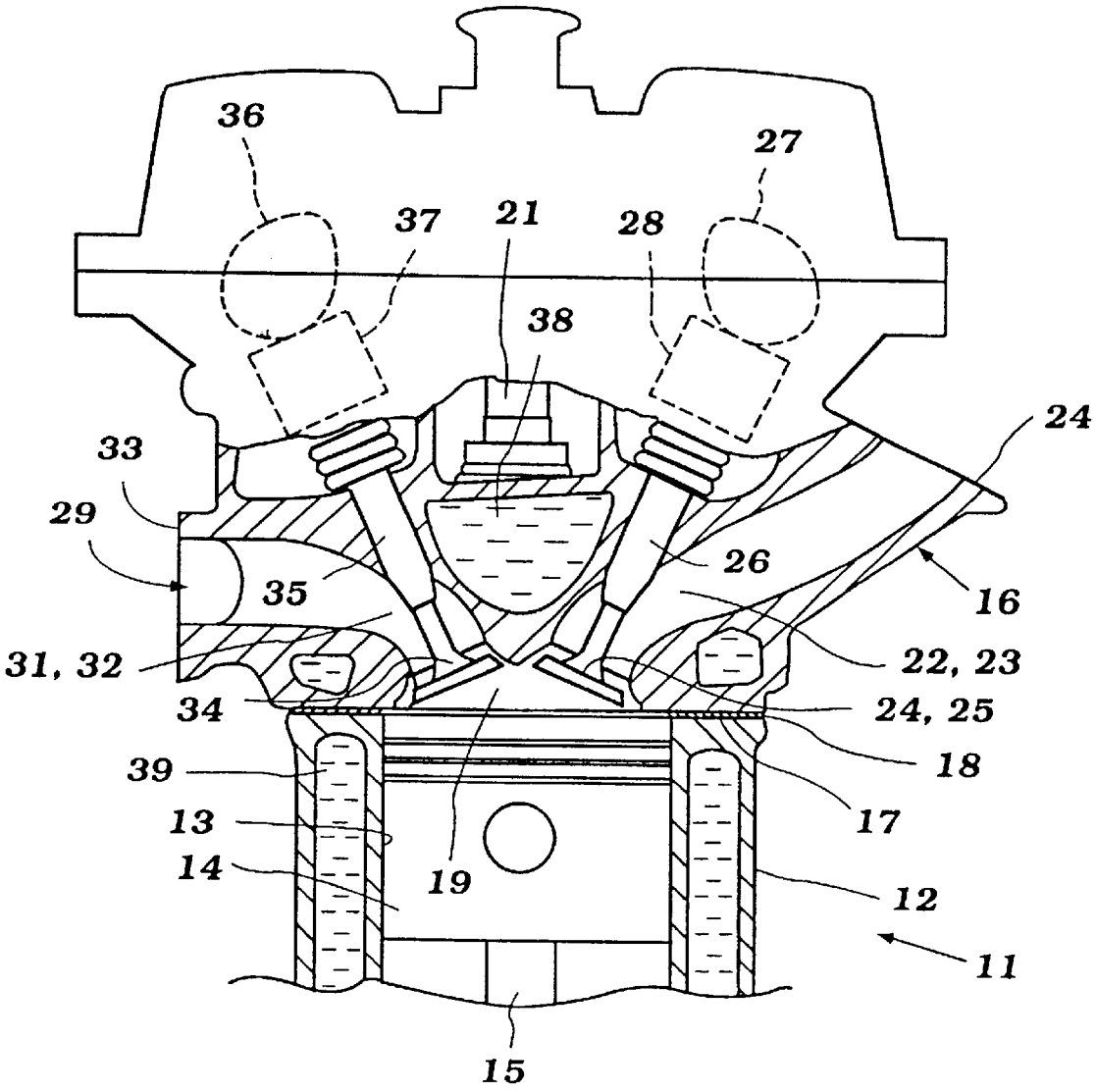
FIG. 1 is a partial view showing the head and upper portion of the cylinder block of an engine constructed in accordance with an embodiment of the invention, with a portion broken away.

Referring now in detail to the drawings and initially to FIG. 1, an internal combustion engine constructed in accordance with an embodiment of the engine is shown partially and is identified generally by the reference numeral 11. In the illustrated embodiment, the engine 11 is of the in-line multiple-cylinder type. It should be readily apparent to those skilled in the art that the invention, which deals primarily with the induction system for the engine 11, can be used in a wide variety of engines having different cylinder configurations and different cylinder numbers. Also, since the invention deals primarily with the induction system, only the upper portion of the cylinder block and the cylinder head are illustrated in the drawings. Where any component of the engine 11 is not depicted or described, it may be considered to be conventional.

The engine 11 includes a cylinder block 12 having one or more cylinder bores 13 in which pistons 14 reciprocate. The pistons 14 are coupled by means of connecting rods 15 to a crankshaft (not shown) for driving the crankshaft in a well-known manner.

A cylinder head, indicated generally by the reference numeral 16, is provided with a lower sealing surface 17 that is maintained in sealing relationship with a cylinder head gasket 18 to perform a seal with the cylinder block 12 around the individual cylinder bores 13. The cylinder head 16 has combustion chamber recesses 19, each of which overlies a respective cylinder bore 13 and which forms with the cylinder bore 13 and the head of the piston 14 a combustion chamber. In accordance with a preferred form of the invention, this combustion chamber has a so-called "lens shape" that is formed by the cylinder head recess surface 19 and a bowl, or recess, formed in the head of the piston 14. This combustion chamber configuration is so named because it has the shape of an optical lens.

A spark plug 21 is mounted in the cylinder head 16 for each cylinder bore and has its gap extending into the combustion chamber recess 19. This spark gap is disposed substantially on the cylinder bore axis.

A pair of intake passages comprised of a primary intake passage 22 and a secondary intake passage 23 are formed in the cylinder head 16 on one side of a plane containing the cylinder bore axis and extending parallel to or coincident with the axis of rotation of the crankshaft. These intake passages 22 and 23 extend from respective openings formed in a surface 24 on the outer wall of the cylinder head 16. An appropriate intake manifold including fuel injectors (as will be described) is affixed to this cylinder head surface 24 in a known manner.

The intake passages 22 and 23 terminate at their outlet ends in respective valve seats, which will be described later by reference to other figures. These valve seats are formed by inserts pressed into the cylinder head surface 19. The flow through the valve seats is controlled by respective intake valves 24 and 25 which are mounted for reciprocation in the cylinder head 16 by valve guides 26 in a well-known manner. An intake camshaft 27 is rotatably journaled in the cylinder head assembly 16 in any known manner and operates the intake valves 24 and 25 through individual thimble tappets 28.

A Siamesed exhaust passage, indicated generally by the reference numeral 29, is formed on the side of the cylinder head 16 opposite the side on which the intake passages 22 and 23 are formed. This exhaust passage 29 extends from a pair of valve seats that form the inlets of branch passages 31 and 32 and extend outwardly through an outer surface 33 of the cylinder head to which an exhaust manifold (not shown) is affixed for discharge of the exhaust gases to the atmosphere through an exhaust system of any known type. Exhaust valves 34 are mounted in the cylinder head 16 by valve guides 35 for controlling the opening and closing of the valve seats.

Like the intake valves, the exhaust valves 34 are operated by means of an overhead mounted exhaust camshaft 36 via thimble tappets 37. The camshafts 27 and 36 are driven in timed relation from the engine crankshaft in any known manner.

Although the invention has been described in conjunction with a four-valve-per-cylinder configuration, it should be readily apparent from the following description that the invention may be employed with engines having any desired number of valves. However, certain facets of the invention have particular utility with engines having at least two intake valves, as will also become apparent.

In the illustrated embodiment, the engine 11 is water cooled, and to this end the cylinder head 16 is formed with a cooling jacket 38. In a similar manner, the cylinder block 12 is formed with a cooling jacket 39. Liquid coolant is circulated through these cooling jackets 38 and 39 in any known manner.

As thus far described, the construction of the engine 11 is fairly typical of a four-valve-per-cylinder engine, and the portion of the construction thus far described may be considered to be conventional. The invention resides in the configuration of the intake passages 22 and 23, and particularly the intake passage 22. This construction is shown in more detail in FIGS. 3–7 and will now be described by reference to those figures.

Figure 2:
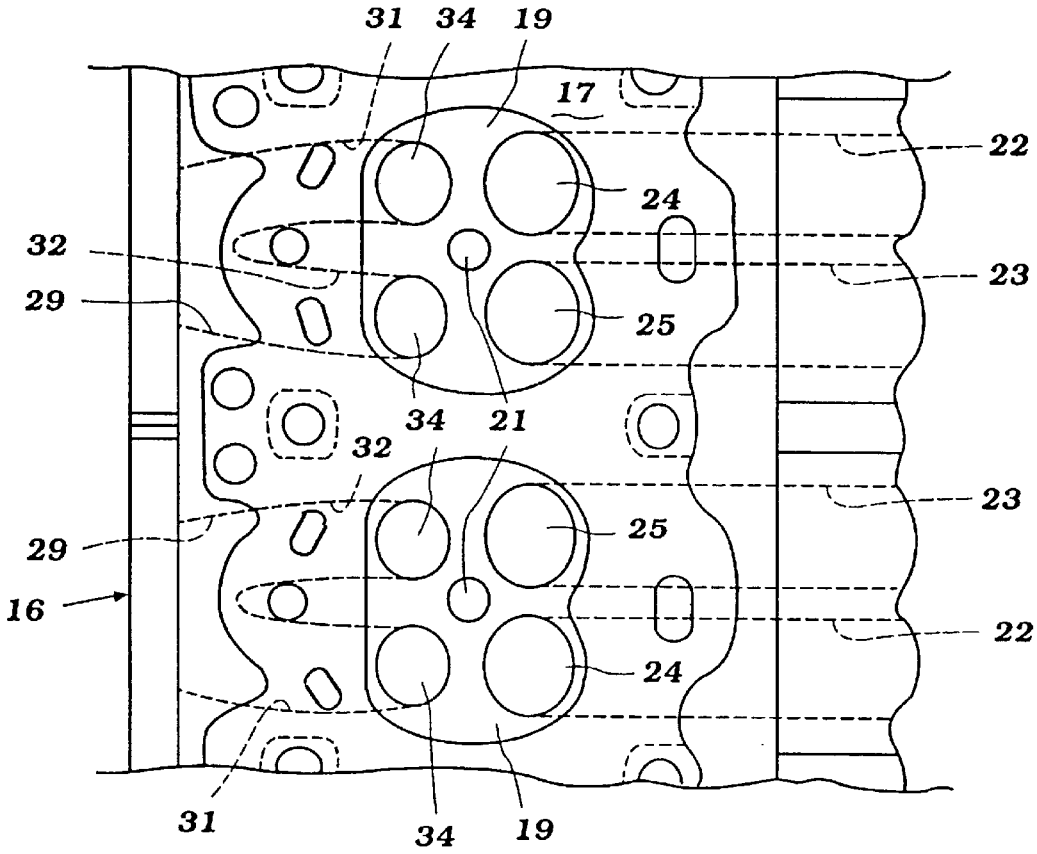
FIG. 2 is a bottom plan view of the cylinder head showing two adjacent combustion chambers.
Figure 3:
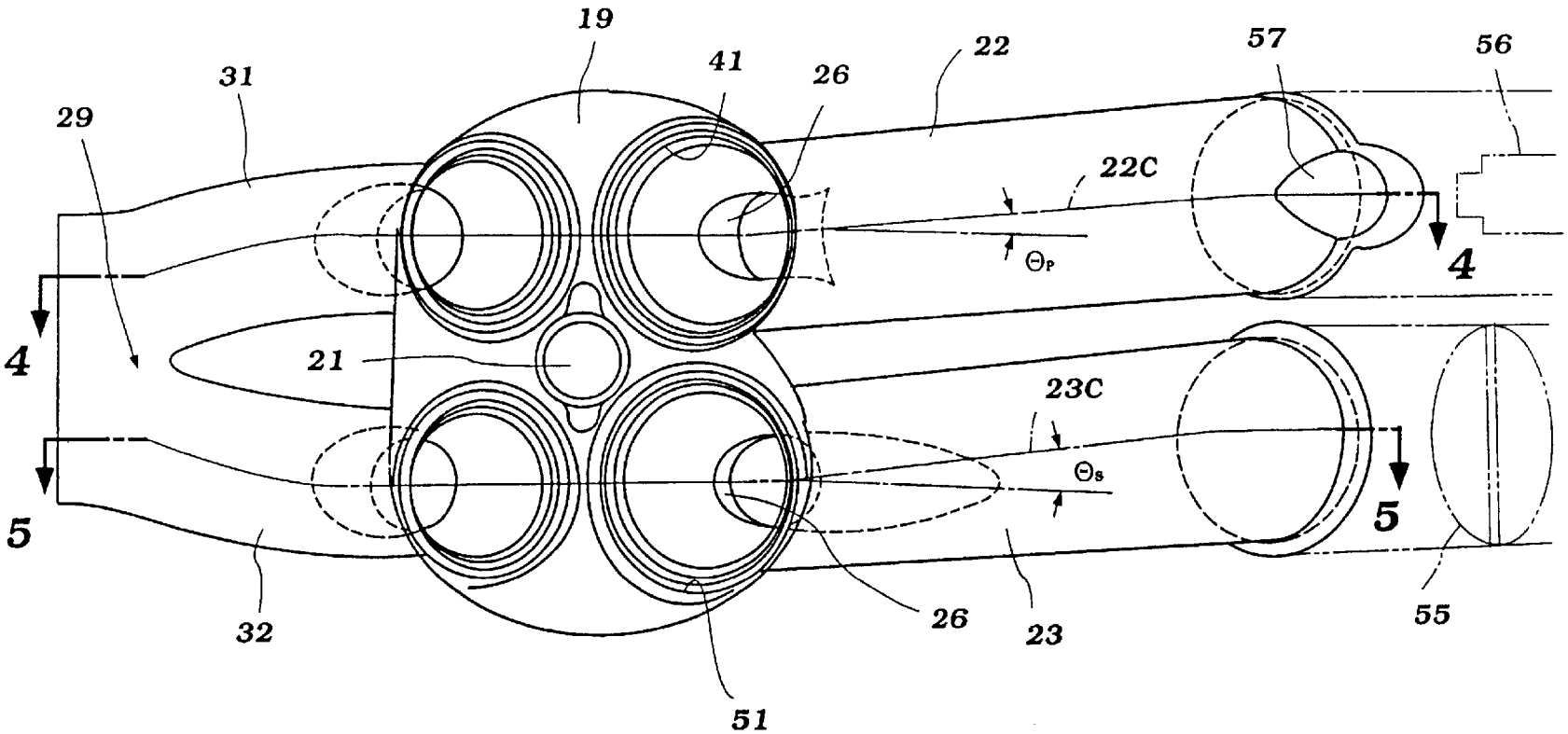
FIG. 3 is an enlarged view, looking in the same direction as FIG. 2, and shows in more detail the intake and exhaust passage configurations.
Figure 6:
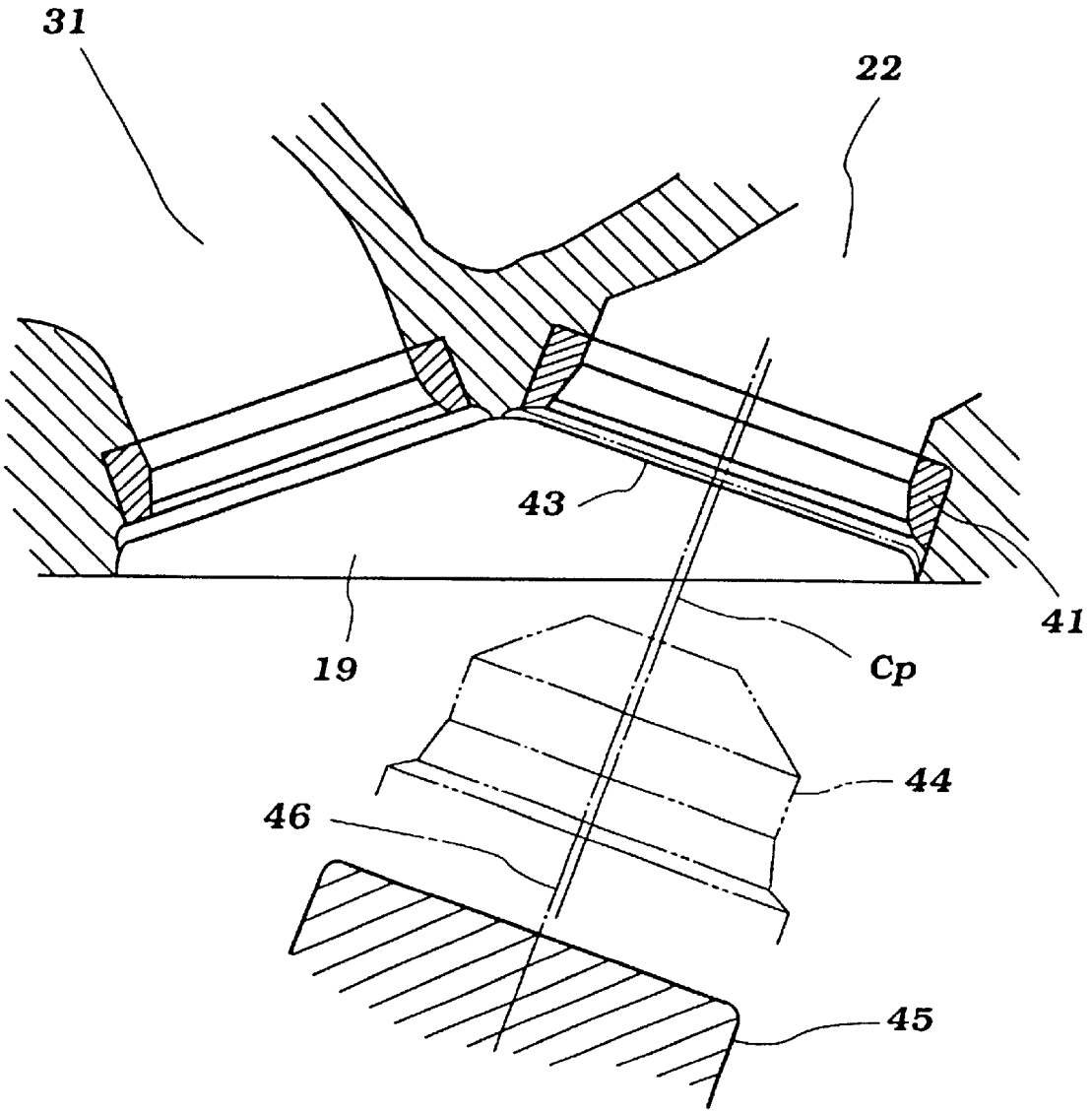
FIG. 6 is an enlarged cross-sectional view taken generally along the same plane as FIG. 4 and shows how the outlet end of the primary induction passage is machined adjacent the valve seat so as to mask the outlet end of the primary intake passage.

The primary intake passage 22 will be described first by reference to FIGS. 3, 4, 6, and 7, with FIG. 6 illustrating how the final machining operation for forming the valve seating surface and masking area around the valve seating surface is formed. Beginning at the inlet opening in the cylinder head surface 24, the primary intake passage 22 has a first curved area 22-1 that merges into a generally straight area 22-2 that is disposed at an acute angle, viewed in the plane of FIG. 2, to the cylinder head sealing surface 17. Also, as seen in FIG. 3, the centerline 22C of the primary intake passage 22, and specifically its portion 22-2, is disposed at a relatively narrow acute angle $\theta_p$ to a plane that extends perpendicularly to the plane containing the axis of the cylinder bore and the axis of rotation of the crankshaft. This relatively narrow angle causes the charge exiting the primary intake passage 22 to generally flow toward one side of the cylinder bore 13, and thus generate a circular swirl to the intake charge.

At the outlet end of the intake passage 22 where the straight portion 22-2 terminates, there is provided a further, curved portion 22-3 that curves down and which continues on into the intake valve seat, indicated by the reference numeral 41. This valve seat 41 is formed as a pressed-in or cast-in insert and has a configuration which will be described later by reference to FIGS. 6 and 7.

Figure 4:
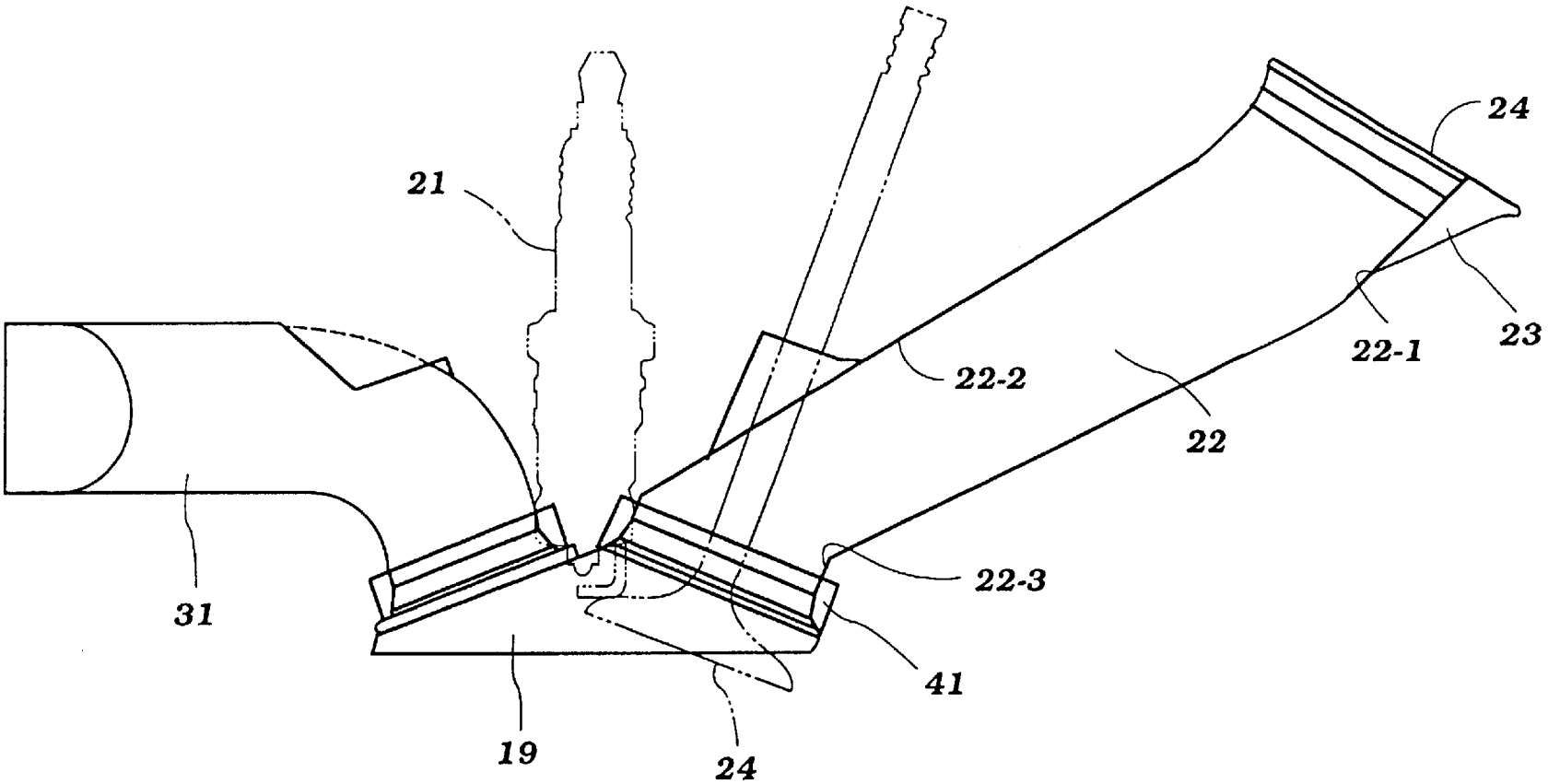
FIG. 4 is a cross-sectional view taken along the line 4—4 and shows the configuration of the primary intake passage.

Generally, in conjunction with this configuration, which is designed primarily to generate turbulence, the section 22-3 is kept as short as possible so that the charge which will enter the combustion chamber 19 when the intake valve 24 is opened, as shown in FIG. 4, will flow primarily across the cylinder bore 12 toward the exhaust side of the cylinder head. This charge will then strike the wall of the cylinder bore 13 and be deflected downwardly until it strikes the upper surface of the piston 14, at which time the flow will be redirected back toward the intake side, and thus generate a tumble action in the combustion chamber in addition to the swirling action.

Figure 7:
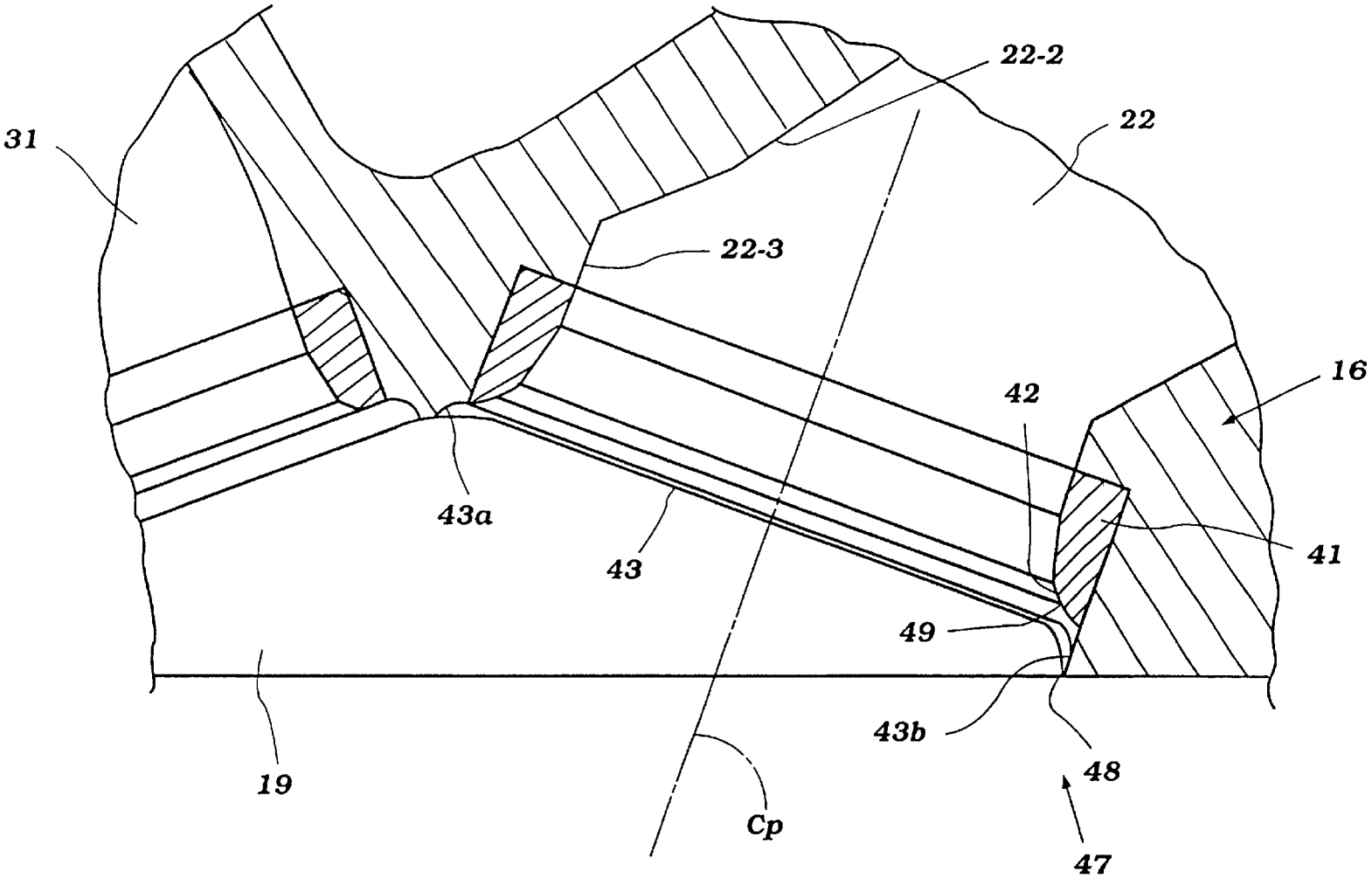
FIG. 7 is an enlarged view taken along the same plane as FIG. 6 and shows the final machined configuration and the masking of the primary intake valve.

The configuration of the seating surface of the valve seat 41 and the surrounding surface of the cylinder head that performs the masking function and the way in which these surfaces are formed will now be described by particular reference to FIGS. 6 and 7. Basically, the valve seat 41 is formed with a seating surface 42 with which the head of the intake valve 24 cooperates. The center of this seating surface is indicated generally by the line $C_p$ in FIG. 7. This seating surface 42 is recessed within a recessed area 43 formed in the cylinder head surface 19. The recess 43 is comprised of a relatively shallow portion $\mathbf{43}_a$ formed on the side adjacent the exhaust valve and a much deeper recess $\mathbf{43}_b$ formed adjacent the periphery of the cylinder bore 12.

This recess 43 and the finished machining of the seating surface 42 is performed by a boring tool 44 (FIG. 6) that is driven by a boring bar 45 and which rotates about an axis 46 that is offset slightly relative to the center $C_p$ of the valve seating surface 42. When viewed in the direction of the arrow 47 in FIG. 7, the lower edge 48 of the cylinder head surface 19 is in substantial alignment with the edge 49 of the seating surface 42 contacted by the intake valve 24. This provides a further masking on the outer side of the primary intake passage 22 that aids in directing the flow across the cylinder bore to generate the aforenoted tumble motion.

Figure 5:
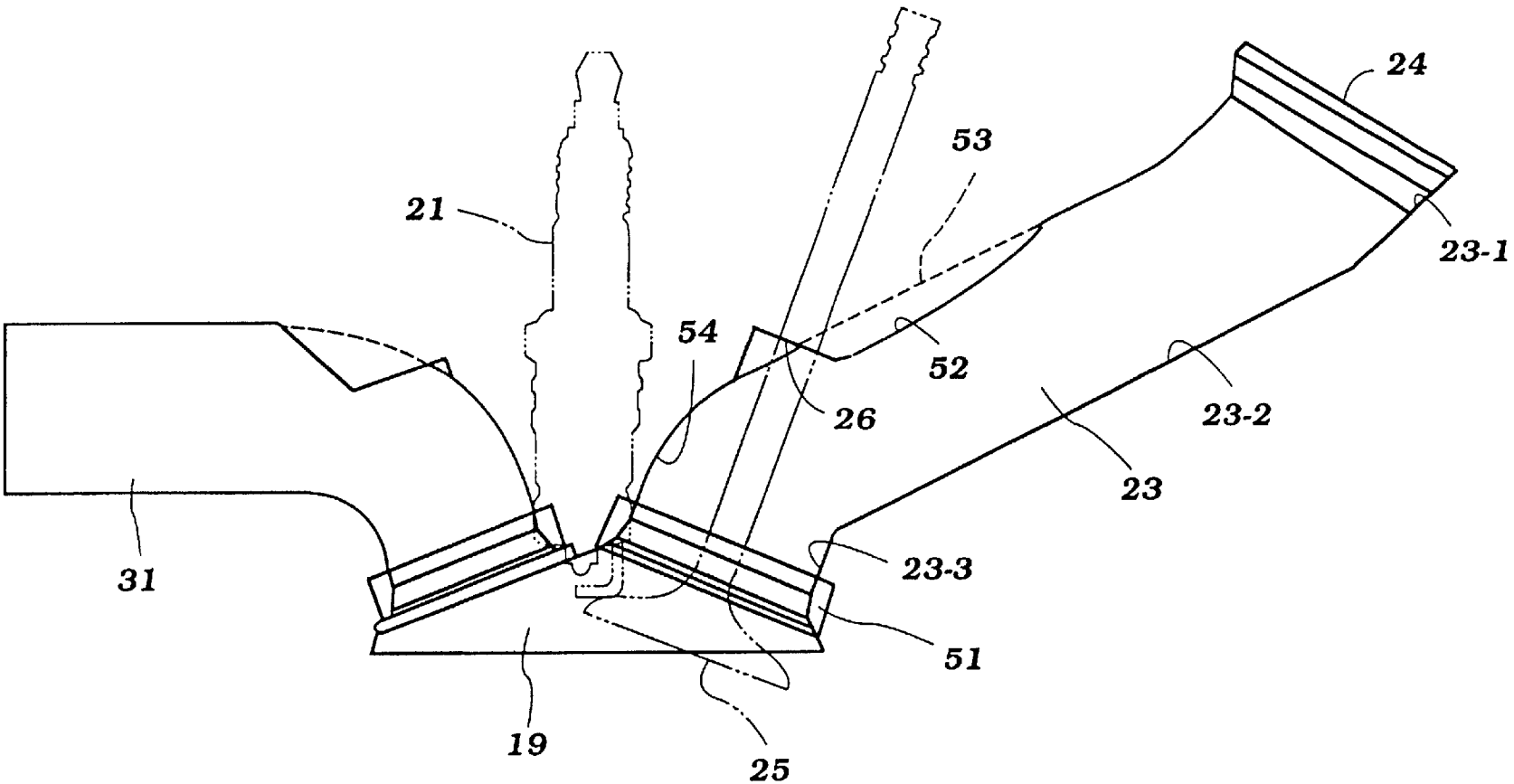
FIG. 5 is a cross-sectional view taken along the line 5—5 of FIG. 4 and shows the configuration of the secondary intake passage.

By virtue of the description of the configuration of the primary intake passage 22, it should be readily apparent that it is very effective in generating a combined swirl and tumble motion. This significantly improves the performance and particularly the rate of combustion when operating at low and mid-ranges of the engine power curve. However, this configuration also reduces the volumetric efficiency of the engine, and thus would limit the maximum power output possible. Therefore, the secondary intake passage 23, which will now be described by reference to FIGS. 3 and 5, is configured to provide a relatively free-breathing intake system that will permit large volumetric efficiencies and high power outputs.

Like the primary intake passage 22, the secondary intake passage 23 is comprised of a first curved section 23-1 which extends from the cylinder head surface 24 and the flow opening therein to a generally straight section 23-2. The straight section 23-2 is disposed at an acute angle to the cylinder head seating surface 17, like the corresponding section of the primary intake passage. However, this angle is somewhat lesser so as to provide a longer curved section 23-3 which terminates at the secondary intake valve seat 51.

The intake valve seat 51 is not masked, and hence the flow through it will be generally uniform around the head of the secondary intake valve 25. In addition, the area of the straight section 23-2 adjacent the valve guide 26 is curved inwardly, as at 52, from a straight continuation, as shown by the broken line 53, so as to cause the flow to be directed more uniformly and less toward the exhaust side of the engine as the charge enters the combustion chamber. In a like manner, the curved area 23-3 is provided with a relatively large volume 54 downstream of the recess area 52 so as to ensure that the charge that flows into the combustion chamber from the secondary intake passage 23 will flow in a generally axial direction and will not cause any significant turbulence.

As may be seen in FIG. 3, the secondary intake passage 23 has its centerline 23C disposed at a larger angle $\theta_s$ to a perpendicular plane than the primary intake passage 22. This further reduces the likelihood of turbulence being generated.

As has been noted, the primary intake passage 22 is tuned and configured so as to better serve the engine at low and mid-range speeds. In order to avoid any obstruction to the swirl generated by this passage, a flow controlling butterfly-type throttle valve 55 is placed in the intake manifold that cooperates with the cylinder head, and hence is shown in phantom in FIG. 3. This throttle valve 55 is operated in staged fashion with the main flow controlling throttle valve (not shown) of the engine so that at low and mid-range speeds substantially all of the air charge will be supplied to the combustion chamber through the primary intake passage 22. However, as the load and speed on the engine increases, the control throttle valve 55 will be opened at a rapid rate, and more flow will enter the combustion chamber through the secondary passage 23. In addition to providing more flow, this tends to reduce the swirl and tumble generated by the primary intake passage 22 so that volumetric efficiency is also improved.

In the illustrated embodiment, there is also provided a fuel injection nozzle 56 which is mounted in the intake manifold aforedescribed and which sprays into a recessed area 57 formed at the surface 24 of the cylinder head around the primary intake passage 22. It has been found that only a single fuel injector 56 is required for supplying all of the charge requirements under all running conditions. However, if desired, an auxiliary fuel injector may also be provided for spraying into the secondary intake passage 23.

It should be readily apparent from the foregoing description that the described construction provides an induction passage which is tuned to provide good running under all running conditions and which has a primary intake passage that is configured so as to introduce swirl and tumble to the combustion chamber to promote combustion and more rapid flame propagation under low and mid-range running conditions. Of course, the foregoing description is that of a preferred embodiment of the invention, and various changes and modifications may be made without departing from the spirit and scope of the invention as defined by the appended claims.

We claim:

1. An intake passage for the cylinder head of an internal combustion engine, said cylinder head having a combustion chamber surface adapted to be in facing relationship to a cylinder bore of an associated cylinder block to form a combustion chamber, said intake passage being formed in said cylinder head and extending from an inlet opening formed in an outer wall of said cylinder head to an intake valve seat formed in said cylinder head combustion chamber surface and having a valve seating surface adapted to be engaged by an intake valve, said intake valve seat being juxtaposed to a peripheral edge of said cylinder bore, said intake passage having a first straight portion extending from said inlet opening toward said intake valve seat disposed at an acute angle to a plane perpendicular to the axis of said cylinder bore and terminating at a portion curving into said intake valve seat, said intake valve seat being recessed at least in part into said combustion chamber surface on a side closest to said cylinder bore surface so that said valve seating surface is spaced inwardly of said combustion chamber surface for forming a masked area around the adjacent peripheral edge of the associated intake valve for restricting the flow into that area to direct the flow of the intake charge into said combustion chamber toward the side of said cylinder bore opposite said intake valve seat to generate a tumble action in the flow into said cylinder bore.

2. An intake passage as in claim 1, wherein the intake passage is further configured so as to generate a swirl in addition to the tumble of the charge entering the combustion chamber.

3. An intake passage as in claim 1, further including a poppet-type intake valve slidably supported within the cylinder head and cooperating with the intake valve seat seating surface for controlling the flow therethrough.

4. An intake passage as in claim 3, wherein the recessing of the intake valve seat forms a masked area around the side of the intake valve closest to the cylinder bore surface.

5. An intake passage as in claim 4, wherein the recessed area is formed by a recess formed in the cylinder head combustion chamber surface that is deeper adjacent the cylinder bore than adjacent the center of the combustion chamber and which defines an edge viewed in the direction of the cylinder bore axis that is substantially aligned with the seating surface of the intake valve seat.

6. An intake passage as in claim 5, wherein the upper surface of the straight portion of the intake passage is substantially uninterrupted for promoting a greater flow on the side of the intake valve seat toward the center of the cylinder bore than the side adjacent the periphery of the cylinder bore.

7. An intake passage as in claim 1, wherein the upper surface of the straight portion of the intake passage is substantially uninterrupted for promoting a greater flow on the side of the intake valve seat toward the center of the cylinder bore than the side adjacent the periphery of the cylinder bore.

8. An intake passage as in claim 1, further including a secondary intake passage formed in the cylinder head and terminating at a second intake valve seat formed in the cylinder head combustion chamber surface.

9. An intake passage as in claim 8, wherein the secondary intake passage is configured so as to generate substantially no tumble to the intake charge delivered to the combustion chamber by it.

10. An intake passage as in claim 9, wherein the secondary intake passage has a configuration that is generally the same in direction as the first-mentioned intake passage.

11. An intake passage as in claim 10, wherein the secondary intake passage is provided with a flow controlling throttle valve that is operated in response to engine running conditions for precluding flow through said secondary intake passage under low and mid-range speed and loads.

12. An intake passage as in claim 11, wherein the second intake valve seat is not masked.

13. An intake passage as in claim 12, wherein the upper surface of the straight portion of the first mentioned intake passage is substantially uninterrupted for promoting a greater flow on the side of the intake valve seat toward the center of the cylinder bore than the side adjacent the cylinder bore.

14. An intake passage as in claim 13, wherein the secondary intake passage is provided with a recessed area along the upper side of its straight section that directs the flow toward the side of the second intake valve seat toward the periphery of the cylinder bore.

15. An intake passage as in claim 11, wherein the first mentioned intake passage is disposed at a lesser acute angle to a perpendicular plane containing the cylinder bore axis than the secondary intake passage.

16. An intake passage as in claim 15, wherein the second intake valve seat is not masked.

17. An intake passage as in claim 16, wherein the upper surface of the straight portion of the intake passage is substantially uninterrupted for promoting a greater flow on the side of the intake valve seat toward the center of the cylinder bore than the side adjacent the periphery of the cylinder bore.

18. An intake passage as in claim 17, wherein the secondary intake passage is provided with a recessed area along its straight section that directs the flow toward the side of the second intake valve seat toward the periphery of the cylinder bore.

*19. An intake passage for the cylinder head of an internal combustion engine, said cylinder head having a combustion chamber surface adapted to be in facing relationship to a cylinder bore of an associated cylinder block to form a combustion chambers said intake passage being formed in said cylinder head and extending from an inlet opening formed in an outer wall of said cylinder head to an intake valve seat formed in said cylinder head combustion chamber surface and having a valve seating surface adapted to be engaged by an intake valve, said intake valve seat being juxtaposed to a peripheral edge of said cylinder bore, said intake passage having a first straight portion extending from said inlet opening toward said intake valve seat disposed at an acute angle to a plane perpendicular to the axis of said cylinder bore and terminating at a second portion curving into and including said intake valve seat, said second portion being formed at the area contiguous to said intake valve seat on a side closest to said cylinder bore surface for forming an area around the adjacent peripheral edge of the associated intake valve for restricting the flow into that area to direct the flow of the intake charge into said combustion chamber toward the side of said cylinder bore opposite said intake valve seat.*

*20. An intake passage as in claim 19 wherein the upper surface of the straight portion of the intake passage is substantially uninterrupted for promoting a greater flow on the side of the intake valve seat toward the center of the cylinder bore than the side adjacent the periphery of the cylinder bore.*

*21. An intake passage as in claim 19, further including a second intake passage formed in the cylinder head and terminating at a second intake valve seat formed in the cylinder head combustion chamber surface.*

*22. An intake passage as in claim 21, wherein the second intake passage is configured so as to generate substantially no tumble to the intake charge delivered to the combustion chamber by it.*

*23. An intake passage as in claim 22, wherein the second intake passage has a configuration that is generally the same in direction as the first-mentioned intake passage.*

*24. An intake passage as in claim 23, wherein the second intake passage is provided with a flow controlling throttle valve that is operated in response to engine running conditions for precluding flow through said secondary intake passage under low and mid-range speed and loads.*

* * * * *